United States Patent [19]

Kumanoya et al.

[11] Patent Number: 5,045,393

[45] Date of Patent: Sep. 3, 1991

[54] METHOD FOR PROVIDING A POLYOLEFIN RESIN SUBSTRATE WITH AN ADHESIVE LAYER

[75] Inventors: Shuichi Kumanoya, Minoo; Makoto Yamamoto, Shiga; Katsumi Sasaki, Osaka; Masahiko Nishimura, Kawanishi, all of Japan

[73] Assignee: National Starch and Chemical Investment Holding Corporation, Wilmington, Del.

[21] Appl. No.: 394,700

[22] Filed: Aug. 16, 1989

[51] Int. Cl.$^5$ ............................ B05D 5/10; B32B 7/12
[52] U.S. Cl. .................................... 428/353; 428/354; 428/424.8; 427/208.2; 427/302
[58] Field of Search ................. 427/208.2, 302, 407.1; 428/353, 354, 424.8

[56] References Cited

U.S. PATENT DOCUMENTS

| | | | |
|---|---|---|---|
| 4,091,195 | 5/1978 | Vitek | 427/208.2 X |
| 4,612,249 | 9/1986 | Packer et al. | 427/302 X |
| 4,661,099 | 4/1987 | von Bittera et al. | 427/208.2 X |

FOREIGN PATENT DOCUMENTS 62-95326  6/1987  Japan.

Primary Examiner—George F. Lesmes
Assistant Examiner—D. R. Zirker
Attorney, Agent, or Firm—Edwin M. Szala

[57] ABSTRACT

A method for providing a polyolefin resin substrate with an adhesive coating having high adhesiveness and thermal resistance comprising the following steps:

1. coating the surface of said polyolefin substrate with a primer film having at least 2 hydroxy groups, and
2. coating said primer film with a molten layer of moisture setting hot melt urethane adhesive composition comprising a urethane prepolymer containing at least 2 NCO radicals.

8 Claims, No Drawings

METHOD FOR PROVIDING A POLYOLEFIN RESIN SUBSTRATE WITH AN ADHESIVE LAYER

BACKGROUND OF THE INVENTION

This invention relates to a two-step method for providing a polyolefin resin substrate with an adhesive layer comprising the steps of coating the surface of a polyolefin substrate with a hydroxy hydrocarbon polymer paint (primer) film containing a catalyst which promotes the reaction between the OH and the NCO radicals; and coating the paint film with a molten layer of a moisture setting hot melt urethane adhesive coating of urethane prepolymers containing NCO radicals which crosslink with the OH groups in the primer coating.

Generally a polyolefin resin such as polyethylene, polypropylene, ethylene propylene diene rubber (EPDM) and the like are low in adhesion, so that various methods have been used to provide adhesive properties to these resin substrates. For example, there is a method to improve adhesion by conducting electric and chemical oxidation treatment to the surface of a polyolefin resin substrate to approve the quality of the surface. There is also a method to improve adhesion by undercoating various primer components on the surface. Primers containing chlorinated polypropylene, isocyanate compound, an addition compound of isocyanate compound to polyhydroxy polyolefin (Japanese Patent Application No. 59-124937), and a reaction product of polybutadiene glycol having hydroxy groups at the end and polyisocyanate are known in the prior art. ( Japanese Patent Application No. 62-95326).

However, in the case of using a thermoplastic resin such as chlorinated polypropylene among said primers, sufficient adhesiveness cannot be ensured, and heat resistibility reaches the softening point of the resin (for example, polypropylene chloride: 60° C. to about 70° C.), at a temperature not exceeding 100° C. An addition compound of polyhydroxy polyolefin and isocyanate compound can expect high heat resistibility, but an improvement of the effect of an adhesiveness to a polyolefin resin is scarcely seen. Its coated liquid reacts with moisture in the air to change the prefer components. Also, the paint film after coating reacts with moisture in the air. The disadvantages are that the adhesiveness is not constant according to a timing of coating of adhesive to be used next to make a control for the adhering process intricate. As for said addition compound, there are disadvantages that if the isocyanate component is used too much, the adhesiveness and thermal resistance are lower than in a case that polyhydroxy polyolefin alone is used. A reaction product of polybutadiene glycol having a hydroxy group at the end, and polyisocyanate is not sufficient in all points such as primary adhesion, thermal resistance and so on.

On the other hand, a method which incorporates the primers mentioned above, and the crosslinked moisture setting urethane prepolymers which is a tacky liquid at room temperature has been developed in order to improve the heat-resistance of the whole adhesive system. However, according to this method, said adhesive does not always provide tackiness at an early stage. However the crosslinking of the NCO and OH groups provides tackiness, but does not provide an initial setting strength and initial bond strength. Therefore, in order to compensate for the lack of the initial setting strength and initial bond strength, pressing the polyolefin resin and adherent with a pressing machine is conducted. However, in these cases, apparatus and hands and space for pressing are required so that the apparatus or the process for adhering becomes a large scale operation. Even if other reaction type adhesives are used or substituted for said adhesives, and since they are usually two-part mixing adhesives (main agent/curing agent), they require hands for mixing, and a mistake in the mixing ratio can occur which could result in a material loss. Moreover, since these two-part mixing type adhesives have slow reaction speed at room temperature, they require said presser and the like, and it is very expensive to press by hand.

Accordingly, an object of this invention is to provide a method for providing a polyolefin resin substrate with an adhesive coating having high adhesion and thermal resistance, wherein said operation is quite easy. A superior adhesiveness can be obtained at an initial stage of the adhesion, and at the same time the heat resistance of the glue layer can be ensured, and the polyolefin resin can be coated with a material via the adhesive coating on its surface.

SUMMARY

To accomplish the above-mentioned object, a method for providing a polyolefin resin substrate with an adhesive coating of high adhesion and thermal resistance according to the present invention comprises the steps of (1) forming a primer (paint) film of hydroxy hydrocarbon polymer on the surface of a polyolefin resin substrate and (2) contacting said primer film with a molten layer of moisture setting urethane hot melt adhesive.

More specifically, the method of providing a polyolefin resin substrate with an adhesive coating having high adhesiveness and thermal resistance comprises the steps of:

1. coating the surface of the polyolefin substrate with a primer film of hydroxy hydrocarbon polymer having at least 2 hydroxy groups and a catalyst, and 2. coating said primer film with a molten layer of moisture setting hot melt urethane adhesive composition comprising urethane prepolymers containing at least 2 NCO radicals, 3. coating the surface of said molten layer with the surface of another material to coat the polyolefin resin substrate.

A polyolefin resin substrate coated with a first primer film containing a hydroxy hydrocarbon polymer, a second coating layer of a molten urethane prepolymer melt adhesive formed on said first film of hydroxy hydrocarbon polymer, wherein said hydroxy radical in the primer film reacts instantly with the NCO radical in the urethane prepolymer coating to provide an instant adhesive surface having strong initial bond strength.

DETAILED DESCRIPTION

The inventors performed a series of experiments looking for a method to provide an adherent to a polyolefin resin substrate with strong adhesion. As a result, they found that an excellent effect can be acquired when a polyolefin substrate is coated with a primer having an OH radical in the molecular structure, and the addition of a moisture setting urethane prepolymer top coating. After further research, the inventors found that if a hot melt moisture setting urethane prepolymer adhesive is used and added to said primer, when the hot melt is melted with heat, an interface between said primer paint film and the adhesive is created by the heat, and the OH radical of the primer reacts with the NCO radical of the hot melt adhesive to cause an initial bond strength, which adheres to the polyolefin resin substrate strongly.

In this invention, certain special hydroxy hydrocarbon polymers are used as primers, and a hot melt moisture setting urethane adhesive is coated on the polyolefin resin substrate which strongly adheres to the surface of another material in a moment.

Polyolefin resin containing substrates according to this invention include an and all substrates made of polyolefin resin such as material (fabrics), molded products and the like.

The hydroxy hydrocarbon polymer used in the primer coating is a hydrocarbon wherein the principal chain is saturated or almost saturated and has a hydroxy group in the molecular structure. Preferably, more than 1-5 hydroxy radicals are in the molecular structure, and more preferably there are about 1.7 to 1.8 hydroxy radials in the structure. The number average molecular weight is about 500 to about 20,000. These hydroxy hydrocarbon polymers are in a wax state at room temperature. The term "almost saturated" means that the double bond of the principal chain is hydrogenated more than 80%, preferably more than 95%, i.e. a hydroxy hydrocarbon polymer is obtained by hydrogenating polybutadiene.

A hydroxy hydrocarbon polymer (polyolefin polyol) is produced by various manufacturing methods. For example, the hydroxy hydrocarbon polymer may be produced by hydrogenating a polyhydroxy diene polymer by a known method. The hydrogenated polyhydroxydiene may be produced from conjugated diene or conjugated diene and vinyl monomer by a known method such as radical polymerization, anion polymerization and the like. It is also produced by oxidizing, decomposing and reducing isobutylene diene monomer copolymer. It is further produced by oxidizing, decomposing and reducing alpha olefin (for example, ethylene, propylene) unconjugated diene (or conjugated diene) copolymer. Among these, using a hydrogenated compound of polyhydroxy diene polymer obtained by hydrogenating polyhydroxy diene polymer especially brings a good result. As mentioned before, the polyhydroxy dienic polymer is produced by known methods such as radical polymerization, anion polymerization and the like, using conjugated diene or conjugated diene and vinyl polymer as the material. According to the radical polymerization method, conjugated diene polymer or copolymer having a hydroxy group at the end is directly obtained if hydrogen peroxide is used as a polymerization initiator, but according to the anion polymerization method, at first, a polymer having alkali metal at the end is manufactured by using an anion polymerization catalyst and then reacting the monoepoxy compound, formaldehyde and the like to produce the polyhydroxy dienic polymer.

As material conjugated diene used in the above mentioned methods, isoprene, chloroprene and the like may be used, and 1,3-butadiene is preferably used. As vinyl monomer to be reacted with these conjugated diene, there are styrene, acrylonitrile, methyl methacrylate, vinyl acetate and the like. In case of using such a vinyl monomer, it is preferable that the used amount is set less than 30% by weight (hereinafter %) of gross monomer amount. Hydrogenation in order to make hydroxy hydrocarbonic polymer from thus obtained polyhydroxy dienic polymer is conducted by an ordinary method wherein the polyhydroxy dienic polymer is reacted under hydrogen atmosphere using a catalyst such as nickel, cobalt, platinum, palladium, ruthenium, rosium and the like alone or together with a carrier.

Another method for producing hydroxy hydrocarbon polymer used in this invention is one that copolymer of alphaolefin and other monomer is oxidized, decomposed and then reduced to obtain the hydroxy hydrocarbon polymer. For example, isobutylene-isoprene rubber polymer obtained by polymerizing cationically isobutylene and butadiene or 1,3-pentadiene is treated by ozonolysis and then reduced with lithium aluminum hydride to produce polyhydroxy polyisoprene. And it is hydrogenated as mentioned above to be able to give hydroxy hydrocarbon polymer used in the present invention.

An example of the hydroxy hydrocarbon polymer used in the present invention is, Polyter-H, manufactured by Mitsubishi Kasei Kogyo, one having 500 to about 5,000 molecular weight can be preferably used. This hydroxy hydrocarbon polymer has a remarkably high adhesiveness to polyolefin resin substrates.

It has been found that a good result can be obtained, if a small amount of catalyst which accelerates a reaction of the OH radical with the NCO radical is added to said hydroxy hydrocarbon polymer primer condition. That is, said catalyst remarkably accelerates a reaction between the hydroxy hydrocarbon polymer and the moisture setting urethane hot melt type adhesive to thereby cause swift and strong adhesion strength and heat resistability even if at room temperature. A catalyst may be a common solvent for the hydroxy hydrocarbon polymer. Examples of other catalysts include amines such as trimethyldiamine, tetramethyl-1,3-butanedmine, triethylamine and the like; and metallic catalyst such as dibutyl tin dilaurate, dimethyl tin dichloride and the like. Among these metallic catalysts, using dibutyl tin dilaurate, which is comparatively easy to use, has high catalytic effect and is preferably used. In case of using it in a solution form, it is preferable that the concentration of the catalyst is in a range of 0.001 to about 10%. A mixing ratio (A)/(B) of said hydroxy hydrocarbon polymer (A) and said catalyst (B) is preferably 5/1 to about 5/0.001 by weight. A ratio more than 5/0.001 provides small initial bond strength and low heat resistibility. Reversely, a ratio less than 5/1 yields an incomplete primer (paint) film in an unstable adhesion state, and provides low adhesiveness. Thus, hydroxy hydrocarbon polymer plus a catalyst is preferably used in the primer composition.

After the hydroxy hydrocarbon polymer and catalyst are dissolved in a solvent, and the surface of polyolefin resin substrate is coated therewith, said coating is dried and evaporated to remove the solvent and form a paint film on the surface of the polyolefin resin. Suitable solvents for said hydroxy hydrocarbon polymer are hydrocarbon solvents such as benzene, toluene, xylene and the like, and a chloric solvent such as trichloroethylene(tricrene), methylene chloride, trichloromethane, trichloroethane and the like, and carbon disulphide. Good results are obtained with chloric solvents such as tricrene which have good compatability with hydroxy hydrocarbon polymers and said catalyst.

As mentioned above, a molten layer of moisture setting urethane hot melt type adhesive is formed on the primer film of the hydroxy hydrocarbon polymer formed on the surface of polyolefin resin substrate. It is a essential that this adhesive is a hot melt type. A representative example is a urethane prepolymer which is produced by a condensation polymerization of polyisocyanate and polyol, has more than two isocyanate (NCO) radicals in a molecular structure, is solid at room temperature, and has a viscosity of about 2,000 to about 70,000 cps at 120° C. As a specific example, a urethane prepolymer which is produced by a condensation polymerization and has 0.25 to about 15% of polyisocyanate content, and an isocyanate index (ratio between isocyanate equivalent and hydroxyl radical equivalent) which is larger than one and smaller than two.

Said adhesive comprising urethane prepolymer is used in a molten state with heat when adhering to said primer film because it is a hot melt type. Then, due to the heat, a radical (OH radical) in the primer film of the hydroxy hydrocarbon polymer formed on the surface of the polyolefin resin substrate reacts in a moment with the NCO radical of the urethane adhesive to provide initial bond strength in a moment. To improve this initial bond strength, it is preferable to use two component type moisture setting urethane hot melt type adhesive which is made by mixing urethane prepolymer with thermoplastics which is compatible, but not reactive with, the urethane prepolymer in a solid state at a room temperature, and has viscosity of 3,000 to about 70,000 cps.

The polyisocyanate which are compounds in said urethane prepolymer, include butylenediisocyanate, hexamethylenediisocyanate, toluenediisocyanate, cyclopenthylenediisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylenediisocyanate, m-phenylenediisocyanate, xylene-diisocyanate, 1,4-naphthylenediisocyanate, 1,5-naphthylenediisocyanate, diphenyl-4,4'-diisocyanate, dichlorohexamethylenediisocyanate, diphenylsulphone-4,4'-diisocyanate, dichlorohexamethylenediisocyanate, furfurldene-diisocyanate, 1-chlorobenzene-2,4-diisocyanate, 4,4',4'-triisocyanatetriphenylmethane, 1,3,5-triisocyanatebenzene, 2,4,5-triisocyanatetoluene, 4,4'-dimethyldiphenylmethane-2,2',5,5'-tetraisocyanate and the like, and they are used alone or together.

Polyol, according to the present invention are mono substituted ester of glycol, polyhydroxypolyol, and addition compound of ethylene oxide or propylene oxide to polyalkylene ether glycol, polyhydroxy polyalkylene ether or polyhydroxy polyester polyol having at least two hydroxy radicals in the molecule such as polyethylene glycol, polypropylene glycol, tetramethylene glycol, polybutadienediol and the like, and they are used alone, or together. The most preferable compound having hydroxy radicals is a high molecular weight diol or triol which has the molecular weight and the crystalinity of a proper viscosity and melting point.

Thermoplastic resins which are used with said urethane prepolymer in order to improve initial bond strength is compatible with the urethane prepolymer but does not react therewith. For example, low molecular weight polymers of ethylene unsaturated polyomer without active hydrogen. As said ethylene unsaturated polyomer, there are ester of $C_1$ to about $C_{12}$ of methacrylic acid, vinyl ester, vinyl ether, fumarate, marate, styrene, acrylonitryl, ethylene, butadiene and isoprene. These are used alone or together to be polymerized. In this case, polymerization is continued until its own viscosity becomes 0.1 to about 0.4. Thus controlled polymerization of the thermoplastic resin with the urethane prepolymer provides viscosity of 3,000 to about 50,000 cps of the two component type moisture setting urethane hot melt adhesives at 120° C., which is the upper limit temperature of heat stability of urethane resin without a plasticizer or tackifier, so that it becomes easy to coat the primer film with the adhesive, improve the initial bond strength, and long life adhesive property, and particularly improve heat resistability. By making the adhesive with a two-component type moisture setting urethane hot melt, the range of the adherant to the polyolefin resin substrate extends to polychloride vinyl, polyester and aluminum.

The ratio of said moisture setting urethane hot melt adhesive and hydroxy hydrocarbon polymer is set so that the equivalent ratio between its NCO radical and OH radical becomes NCO/OH=0.8 to about 25,000. Preferably the ratio of NCO/OH is 1 to about 5,000. If the ratio of NCO/OH is not within this range, there will be no adhesion of an adhesive coating to the polyolefin resin substrate.

In accordance with this invention, said dual coatings adhere to the polyolefin resin substrate as discussed below. That is, prior to said adhesion, an organic solvent solution of hydroxy hydrocarbon polymer is coated on a surface of the polyolefin resin substrate and dried. Optionally said catalyst is contained in said solution. However, if so, a mixture of the catalyst and hydroxy hydrocarbon polymer is so stable that adhesive property is not influenced even if the mixture is left as it is for a long time after coating and drying. Therefore, it is extremely easy to use. Moreover, said organic solvent solution of said mixture has not a pot life, so that it is possible to use eternally if only condensation is controlled, and it is quite easy to control, and there is little probability of poor adhesion. Ordinary methods such as soaking method, spraying method, brushing method is adequately selected as a coating method of said organic solvent solution onto the surface of a polyolefin resin substrate. The coating amount in this case is 0.02 g/m² to about 25 g/m² of solid part conversion, preferably 0.5 g/m² to about 5 g/m². Bond strength becomes small with a coating amount of less than 0.02 g/m². On the contrary, heat resisting adhesiveness becomes poor with a coating amount of more than 25 g/m. Thus, the surface of the polyolefin resin substrate treated with primer is coated with a molten layer (120° C. to about 140° C.) of moisture setting urethane hot melt type adhesive, and adhesion with the surface of the coat is conducted by pressing a moment. In this case, since the adhesion is finished in a moment, it is not necessary to use conventional presser and the like. In a case where the substrate is a molded product made of polyolefin resin, both surfaces are coated with a solvent solution of said hydroxy hydrocarbon polymer and dried to form the primer coat One surface is coated with the melt of said moisture setting urethane hot melt type adhesive, and both surfaces are coated by contacting and pressing in a moment. The solvent solution of hydroxy hydrocarbon polymer is coated on the surface of the polyolefin resin substrate and dried to form the primer film. The melt of moisture setting urethane hot melt type adhesive is coated on the primer treated surface of the substrate and the adhesion is completed in a moment by contact with both surfaces during the melting state for a moment.

Thus, according to the present invention, high initial bond strength is obtained, coating operation is quite easy and tools such as pressers are not necessary. Furthermore, the coated substrate is ensured heat resistability at temperatures greater than 100° C., and instant adhesion to the polyolefin resin substrate. Particularly, an excellent economical effect is obtained if the method according to the present invention is applied for adhering plastic sheet and fibre structure to the inner part of door panel of automobile. That is, conventionally the door panel of automobile is formed by making a base plate from polypropylene, coating first adhesive thereto to adhere urethane foam molding sheet therewith and adhering plastic sheet or fiber structure which is the most outside layer on said urethane foam molding sheet using second adhesives. In the above case, the primer film of hydroxy hydrocarbon polymer according to the present invention is formed on the polypropylene base plate of the door panel, the molten layer of the moisture setting urethane hot melt type adhesive according to the present invention is coated on said primer film and plastic sheet and the like which becomes the most outside layer, is pressed for a moment to adhere in a moment. Therefore, according to this method, one process in the conventional adhering processes can be removed and since an operation of conventional urethane foam molding sheet is replaced for adhesive layer which is cured in a bubbled state, urethane foam molding sheet can also be removed to be extremely economical.

ADVANTAGES OF THE INVENTION

As mentioned above, this invention comprises the steps of forming a first coating layer of hydroxy hydrocarbon polymer on the surface of the polyolefin resin substrate, coating a xolten layer of moisture setting urethane hot melt type adhesive on said first coating layer, and contacting a surface of said adhesive layer with a surface of a material to coat the polyolefin resin substrate, (heretofore difficult to coat).

Accordingly, using the presser before performing the initial adhesion in conventional methods is not required. Further, since the adhesive layer has high heat resistability, the present method can h=applied for coating the polyolefin resin used in a section where high heat resistability is required.

Since the intensity of adhesion of the present invention is very high and the excellent adhesive condition is maintained for a long time, the reliability of the adhesive section is very high.

The above results are obtained for the following reasons:

1. The primer, hydroxy hydrocarbon polymer has a similar chemical formula to the polyolefin resin to h=coated and also has an OH radical. The adhesive, moisture setting urethane hot melt type adhesive has NCO radicals which react with said OH radical.

2. Since said moisture setting urethane adhesive is a hot melt type which contacts the primer film of in a state of melting, the setting of the adhesive is performed at high rate and at high reactive density compared with room temperature setting.

Accordingly, this invention the polyolefin resin substrate to which adhesion is almost impossible hitherto, can be adhered in a moment.

In particular, if the two component type mixture of the urethane prepolymer and at least one kind of a polymer of ethylene polymers compatible with urethane prepolymer which is one of the components of the above adhesive, is used as the above moisture setting urethane hot melt type adhesive, it establishes higher initial adhesion. A polymer of ethylene monomers, thermoplastic saturated polyester, rosin derivative which have no active hydrogen or no double bonds, terpene phenol copolymer or its hydrated compound may be used alone or together.

Examples are described below together with comparative examples.

Prior to the examples, five types of primer solution are prepared as below mentioned and at the same time one kind of moisture setting urethane hot melt type adhesive is prepared.

Preparation of Primer Solution

Primer Solution 1 (according to the present invention): 60 g of commercially available hydroxy hydrocarbonic polymer which is solid at room temperature (Polyter H, a product of Mitsubishi Kasei Kogyo) and 1,000 g of tricrene are put in flask and stirred, 0.6 g of dibutyl tin dilaurate is added and stirred for 30 minutes at room temperature, and dissolved completely to obtain hydroxy hydrocarbon primer solution.

Primer solution 2 (not according to the present invention):
Tricrene solution of polypropylene chloride (condensation: 6%).

Primer solution 3 (not according to the present invention):
Addition compound of isocyanate having 1,3,5-oxadiazin-2,4,6-trion ring and polyhydroxy polyolefin is formed according to the reference examples 1 and 4 of Japanese Patent Publication Tokkaisho 59-124937 and 10.7 g thereof is dissolved in 109 g cf toluene to obtain primer solution.

Primer solution 4 (not according to the present invention):
Addition compound of 10 parts by weight (hereinafter pbw) of polybutadieneglycol having hydroxy radical at the end which has 100% of hydrogenation ratio, 14 pbw of MD, 190 pbw of toluene are formed according to an example disclosed in Japanese Patent Publication Tokkaisho 62-95326 to obtain primer solution.

Primer solution 5 (not according to the present invention).
100 pbw of polyolefin polyol (Polyter H) and 30 pbw of trichloroisocyanulate are dissolved and reacted with 1,900 pbw of toluene to make this reaction product primer solution.

Preparation of Moisture Setting Urethane Hot Melt Type Adhesive 1

A gas introducing pipe, a pipe for adding later, a thermometer, a stirring machine and an equipment for heating and cooling are placed in a reactor of 1,000 cc. 11 types of materials are prepared.

No. 1: 275.8 g of polypropyleneglycol (molecular weight 1,000).
No. 2: 88.9 g of 1,6-hexandiol, neopentylglycoladipate (molecular weight 3,000).
No. 3: 29.3 g of 1,6-hexandiol, neopentylglycoladipate (molecular weight 1,000).
No. 4: 17.8 g of butylmethacrylate
No. 5: 94.1 g of butylmethacrylate
No. 6: 9.4 g of methylmethacrylate
No. 7: 53.6 g of methylmethacrylate
No. 8: 0.68g of dodecylmercaptan No. 9: 1.70 g of benzoylperoxide
No. 10: 0.60 g of benzoylperoxide
No. 11: 131.1 g of methylenebisphenyldiisocyanate Next, said reactor is filled with dried nitrogen gas and materials of Nos. 1, 2, 3, 4, 5, 6, 8 & 9 are added thereto respectively. During the reaction, dried nitrogen gas is introduced slowly under the liquid level of liquid form body within the reactor and is continued to flow in a bubbling state and inner temperature of the reactor is set at 80° C. and then materials No. 5 and 7 are added uniformly for one hour and further the reaction is conducted for three hours maintaining the temperature at 80° C. Then, after material No. 10 is added and continued the reaction for two more hours at 80° C., material No. 11 is added. Next the temperature is raised at 100° C. and maintained. At this stage the reduced pressure state of 120 cmHg to about 130 cmHg is made and the reaction is continued for 20 to 30 minutes, then the stirring is stopped, and the reaction product is removed in a hot state from the reactor by pressuring inside the reactor with dried nitrogen gas. Thus, obtained moisture setting urethane hot melt type adhesive is referred to as adhesive 1.

Component composition of this adhesive 1 is as follows:

| | |
|---|---|
| Methacrylate polymer | 25% |
| Urethane prepolymer | 75% |
| Isocyanate radical | 1.9% |
| Viscosity at 100° C. | 64,000 cps |
| Viscosity at 120° C. | 25,250 cps |
| A condition at room temperature | solid |
| Characteristic viscosity in Tetrahydrofuran/ethanol (9/1) | 0.18 |
| Appearance | half transparent amber |
| Molecular weight of urethane prepolymer (calculated value) | 3315 |
| Isocyanate index | 0.6 |

This time adhesion is performed as follows using said materials

EXAMPLE 1

Said primer solution 1 is coated (with a brush) on a surface of commercially available polypropylene sheet having a thickness of 1 mm and dried at room temperature. The coated amount is 5 g/m². Said moisture setting urethane hot melt type adhesive is coated on the first coating by spraying the molten adhesive at 120° C. A polyester fiber textile is put thereon quickly and pressed with a weight roll for a moment to complete the adhesion.

COMPARATIVE EXAMPLE 1

Primer solution 2 is substituted for primer solution 1, using the same adhesion procedure as in Example 1.

When the temperature is raised to 70° C. in a test of heat resisting property mentioned later, this peeled off solely to become adhesion area zero.

COMPARATIVE EXAMPLE 2

Primer solution 3 is used substituted for primer solution 1, using the same adhesion procedure as in Example 1.

In the test properties mentioned later, this has low final adhesion intensity of 12 kg/in. in case 2 and 4 kg/in. In case 3 the stability test of adhesiveness are poor.

COMPARATIVE EXAMPLE 3

Primer solution 4 is substituted for primer solution 1, using the adhesion procedure as in Example 1.

In the test of properties mentioned later, this has small initial bond strength as 2 kg/in. and also small final bond strength as 7 kg/in. As to heat resisting properties, this was not peeled off when 100 g of weight is used. But if the weight is changed to 500 g, 80% of peeling off area ratio after 72 hours and short of heat resisting property. And in a stability test of adhesion property, the peeling intensity is respectively 7 kg/in. in case 1, 3 kg/in. in case 2 and 2 kg/in. in case 3. The intensity is not stable.

COMPARATIVE EXAMPLE 4

Isoprene-styrene-isoprene block copolymeric hot melt adhesive (Belmelt MT. product of Kanebo-NSC) is substituted for the moisture setting urethane hot melt adhesive 1, using the adhesion procedure as in Example 1, except that the temperature of said MT-57 when coated is 180° C. The heat resisting property test mentioned later, shows the peeling off after 30 minutes in an oven at 100° C.

COMPARATIVE EXAMPLE 5

Moisture setting urethane prepolymer adhesive in liquid form at room temperature (KBKRR-12TA, product of Kanebo-NSC) after evaporation is substituted for said moisture setting urethane hot melt type adhesive. The adhesion procedure is conducted as in Example 1. In the property test mentioned later, initial setting strength and initial bond strength are small and it was poor in productivity and economy.

COMPARATIVE EXAMPLE 6

Primer solution 5 is used substituted for primer solution 1. Otherwise, adhesion is conducted as in Example 1.

In the property test mentioned later, heat resistability is low as 20 cm of peeling area (peeling ratio 80%) and adhesiveness is a little small.

Above mentioned Example 1 and Comparative Examples 1–6 are shown in Table 1 together with results of property test of each adhered part.

TABLE 1

| | Example 1 | Comparative Examples | | | | | |
|---|---|---|---|---|---|---|---|
| | | 1 | 2 | 3 | 4 | 5 | 6 |
| Primer Solution | 1 | 1 | 2 | 3 | 1 | 1 | 5 |
| Adhesive | 1 | 1 | 1 | 1 | KBKMT-57 | KBKRR-12 | — |
| NCO/OH equivalent ratio | 16 | — | — | — | 0 | 16 | — |
| Initial setting strength (kg/in.) | 2.5 | 2.5 | 2.5 | 1.0 | 3.0 | 0.0 | 2.5 |
| Initial bond strength (kg/in.) | 5.0 | 5.0 | 5.0 | 2.0 | 5.0 | 1.0 | 4.0 |
| Bond strength (kg/in.) | 15 | 12 | 12 | 7.0 | 6.0 | 12 | 7.0 |
| Adhesiveness Stability (kg/in.) | | | | | | | |

TABLE 1-continued

|  | Example 1 | Comparative Examples | | | | | |
|---|---|---|---|---|---|---|---|
|  |  | 1 | 2 | 3 | 4 | 5 | 6 |
| Case 1 | 15 | 12 | 12 | 7.0 | 6.0 | 12 | 7.0 |
| Case 2 | 15 | 12 | 9.0 | 3.0 | 6.0 | 12 | 7.0 |
| Case 3 | 15 | 11 | 4.0 | 2.0 | 6.0 | 11 | 7.0 |
| Heat resistability 100° C. | 0 | 100 | 50 | 70 | 100 | 20 | 30 |
| (peeling ratio: %) 100° C. | 0 | 100 | 100 | 100 | 100 | 60 | 100 |

Note:
Proper value of initial setting strength is more than 1 kg/in.
Proper value of initial bond strength is more than 1 kg/in.
In initial property stability, time passed until adhesive is spread after primer is coated is within one minute (case 1), four hours (case 2) and seventy-two hours (case 3)

Initial Setting Strength Measuring Test

Adhesion strength just after coating and bonding is measured in this test. This is an important test to measure whether it is fit to production line of a belt conveyer manner or not. It is significant to fit thereto substantially and economically. Fitting standard is based on that the adhered part is not peeled off and not slipped out even if a simple treatment is done at the adhered part, and the case that the intensity obtained by T-type peeling of adhered piece of said polypropylene/polyester fibre textile cut in 25 mm wide and 150 mm long is more than 1 kg/in. is judged experiencedly adapted. The measuring machine is an Instron tester and pulling speed is set at 200 mm/min. The measuring temperature is 20° C.

Initial Bond Strength Measuring Test

In this test, adhesive intensity after 3 hours has passed is measured after coating and adhering. It is an important test to measure whether an adhesive to be tested can endure rather sever following processes or not. Fitting standard is defined more than 2 kg/in. of the intensity by measuring T-type peeling intensity as well as said initial setting strength measuring test.

Adhesion Strength Test

In this test, T-type peeling intensity is measured by curing a test piece unpressedly under conditions of 20° C., 65% RH after adhering as well as said initial setting strength test. This is an important test to know what property the adhesive tested has finally.

Stability Test of Adhesive Property

This is an important test to know what degree of stability the tested adhesive shows in the way of adhesion process. In this method, T-type peeling intensity is measured as well as said initial setting strength test by dividing into three cases. That is, in case of coating the adhesive to each test piece, just after coating primer solution on adherend, polyolefin resin (case 1), after four hours passed (case 2) and after 72 hours passed (case 3).

The adhesive which the results of the measurement by cases 1, 2 and 3 do not change is regarded that it has a good stability to obtain a high trust. The test piece after coating primer solution is cured at 20° C., 65% RH for a predetermined time and then is coated the adhesive.

Heat Resistibility Test

This test determines the degree of heat resistibility of the adhesive. In this testing method, test pieces are made as well as in the initial bond strength test, and one end of the textile is peeled off, folded to 180° C. direction, and of a 500g weight is placed at the end. This is placed in an oven at 60 to about 130° C. for 72 hours (it is based upon the adapted standard of heat resistibility of the interior material of an automobile). The adapted standard is that an adhered area of polypropylene/textile is not reduced compared with the test before.

An example in which two component type moisture setting urethane hot melt type adhesive (adhesive 2) is used as moisture setting urethane adhesive.

At first two component type adhesive 2 is prepared prior to the example.

Preparation of Adhesive 2

Below mentioned materials are not put in an material mixer disposed with a mixing apparatus, heating apparatus and a vacuum apparatus with a ratio of below mentioned. 80.22 parts by weight of ethyleneoxide-capped polypropyleneglycol (with 4,000 molecular weight) is put in the mixer, then temperature in the mixer is raised to 150° C., the mixer is evacuated and removed gas. After removing gas sufficiently, 19.78 pbw of molten liquid made by warming 4,4'-diphenylmethanediisocianate, at 68° C. to about 72° C. is put. After that the temperature of the mixer is raised to 74° C. to about, 77° C. The reaction is continued at 80° C. until the ratio of isocyanate in the reaction product becomes 5.5 to about 5.5%.

After finishing the reaction, its product (urethane prepolymer) is taken out to a container filled with dried nitrogen gas to cut moisture and is taken custody.

On the other hand, 44.57 pbw alpha-methylstyrene tackifying resin (Crystalex 3,000, softening point is 97 to about 103° C. B&R type, a product of Hercules Chemical) is added to a mixer disposed with a pipe for supplying dried nitrogen, a pipe for evacuating, means for heating and stirring, and after melting them, 20.10 pbw of ethylene vinyl acetate copolymer (vinyl acetate content 51%, melt index 3.5.) 0.6 pbw of ultraviolet rays absorber (Tinuvin, a product of CIBA Geigy), 0.23 pbw of hindered phenol antioxidization agent are added thereto. They are mixed with stirring at 150° C. until they become smooth. After finishing the mixing, nitrogen gas is stopped supplying and evacuated and degassed: Then 34.5 pbw of urethane prepolymer produced as above mentioned is added to the mixture blowing dried nitrogen gas into the mixer and stirred until the 34.5 pbw of urethane prepolymer produced as above mentioned is added to the mixture blowing dried nitrogen gas into the mixer and stirred until the inside mixture is blended completely. Subsequently, after evacuating and degassing, the inside mixture (adhesive 2) is taken out of the mixer while it is hot and put in a container filled with dried nitrogen and sealed.

EXAMPLES 2-5

Primer solution is prepared by changing an amount of dibutyl tin dilaurate in the primer solution 1 used in said Example 1 as shown in Table 2 and by using the solution a paint film is formed on the surface of adherend, commercially available polypropylene sheet (thickness: 1 mm) as well as Example 1. Adhesive 2 is coated by spray in a molten state at 120° C. thereon and pasted together and pressed by weight roll in a moment to adhere.

Properties of adhered part of thus obtained adherents are shown in Table 2 by testing as well as in Table 1. Every example shows good properties, however, Example 3 using two component type adhesive is more superior in initial bond strength than Example 1 as clearly seen from the comparison between Example 1 of Table 1 and Example 3 of Table 2.

TABLE 2

|  | Example 2 | Example 3 | Example 4 | Example 5 |
|---|---|---|---|---|
| Composition of primer (parts by weight) | | | | |
| Polyter H | 6.0 | 6.0 | 6.0 | 6.0 |
| Tricrene | 100 | 100 | 100 | 100 |
| Dibutyl tin dilaurate | 1 | 0.1 | 0.01 | 0 |
| Adhesive | No. 2 | No. 2 | No. 2 | No. 2 |
| NCO/OH equivalent ratio | 16 | 16 | 16 | 16 |
| Initial setting strength (Kg/in.) | 2.5 | 2.5 | 2.0 | 1.5 |
| Initial bond strength (Kg/in.) | 5.5 | 5.5 | 4.0 | 4.0 |
| Bond strength (Kg/in.) | 13 | 15 | 15 | 11 |
| Heat resistibility (peel ratio: %) (130° C., 500 g: weight suspension/in.) | 10 | 0 | 0 | 5.0 |

*Adhesive No. 2 stands for a two-part type moisture setting urethane hot melt adhesive.

EXAMPLES 6-9

A primer solution is newly prepared by putting 100 g of said Polyter H, 5 g of dibutyltindilaurate and 1000 g of methylene chloride in a flask and stirring them in order to research the relation between the coated amount of primer solution and adhesiveness. Then only the amount of the primer solution which is shown in Table 3 mentioned below are coated. Otherwise, the adhesion is conducted as well as Example 1. Results of property rest of the adhered part of thus obtained adhered body are shown in Table 3. Primer solution can get largest effect when the coating amount is used in a adequate range.

TABLE 3

|  | Example 6 | Example 7 | Example 8 | Example 9 |
|---|---|---|---|---|
| Coated amount of primer to polyolefin resin body (solit part conversion g/m) | 20 | 2 | 1 | 0.1 |
| NCO/OH equivalent ratio | 4 | 40 | 80 | 800 |
| Initial bond strength (Kg/in.) | 1.5 | 2 | 2.5 | 3.0 |
| Initial bond strength (Kg/in.) | 4 | 5 | 6 | 5 |
| Bond strength (Kg/in.) | 13 | 14 | 15 | 14 |
| Heat resistibility (peeling ratio: %) (130° C., 500 g: weight suspension/inc.) | 5 | 0 | 0 | 0 |

We claim:

1. A method for providing a polyolefin resin substrate with an adhesive coating having high adhesiveness and thermal resistance comprising the steps of:

(a) coating the surface of said polyolefin resin substrate with a primer film of hydroxy hydrocarbon polymer having at least two hydroxy groups wherein the principal chain is saturated or substantially saturated and the number average molecular weight of said hydroxy hydrocarbon polymer is about 500 to 20,000, said hydroxy hydrocarbon polymer being in a wax state at room temperature, and catalyst which accelerates the reaction of OH radicals with NCO radicals, and (b) coating said primer film with a molten layer of a moisture setting hot melt urethane adhesive comprising a urethane prepolymer containing at least 2 NCO radicals in its molecular structure, is solid at room temperature and has a viscosity of about 2,000 to 70,000 cps at 120° C., wherein the equivalent ratio of NCO radical in said moisture setting hot melt adhesive to the OH radical in said hydroxy hydrocarbon polymer is 0.8 to about 25,000.

2. The method according to claim 1, wherein the surface of the molten adhesive layer is coated with the surface of another substrate to coat the polyolefin substrate.

3. The method for adhering polyolefin resin to a substrate in accordance with claim 1, wherein said moisture setting urethane hot melt adhesive contains thermoplastic resin which is compatible with said urethane prepolymer but does not react with it, and it is solid state at room temperature and its viscosity at 120° C. is 3,000 to about 70,000 cps.

4. The method in accordance with claim 1, wherein the equivalent ratio of the NCO radical in said moisture setting urethane hot melt adhesive to the OH radical in said hydroxy hydrocarbonpolymer is 1 to about 5,000.

5. A method in accordance with claim 1, wherein the interface temperature of both surfaces to be adhered is greater than 40° C. and the urethane prepolymer adhesive is applied on the first coating by spraying the molten adhesive at a temperature of 120° C. to 140° C.

6. The method in accordance with claim 1, wherein the molten layer of said moisture setting urethane hot melt adhesive is formed by coating it in a state that said adhesive is molten and foamed.

7. A polyolefin resin substrate coated with a first primer film containing a hydroxy hydrocarbon polymer having at least 2 hydroxy groups wherein the principal chain is saturated or substantially saturated and the number average molecular weight of said hydroxy hydrocarbon polymer is about 500 to 20,000, and catalyst which accelerates the reaction of OH radicals with NCO radicals, a hot melt adhesive coating layer of a moisture setting molten urethane prepolymer hot melt adhesive coated on said first primer film, said urethane prepolymer containing at least 2 NCO radicals in its molecular structure and having a viscosity of about 2,000 to 70,000 cps at 120° C., and the equivalent ratio of NCO radicals in said hot melt adhesive to the OH radical in said hydroxy hydrocarbon polymer is 0,8 to about 25,000, thereby providing an instant adhesive surface having a strong initial bond strength.

8. The coated polyolefin substrate of claim 7 wherein said moisture setting urethane hot melt adhesive contains thermoplastic resin which is compatible with said urethane prepolymer but does not react with it and is in solid state at room temperature and has a viscosity of about 3,000 to 70,000 cps at 120° C.

* * * * *